Feb. 27, 1962 J. P. JONES 3,023,387

MAGNETIC CORE ARTICLE

Original Filed April 25, 1955 2 Sheets-Sheet 1

*INVENTOR.*
JOHN PAUL JONES
*BY*
Carl Fissell Jr
AGENT

Feb. 27, 1962 J. P. JONES 3,023,387

MAGNETIC CORE ARTICLE

Original Filed April 25, 1955 2 Sheets-Sheet 2

*INVENTOR.*
JOHN PAUL JONES

BY Carl Fissell Jr.

AGENT

United States Patent Office 3,023,387
Patented Feb. 27, 1962

3,023,387
MAGNETIC CORE ARTICLE

John Paul Jones, Norwood, Pa., assignor to Burroughs Corporation, Detroit, Mich., a corporation of Michigan Original application Apr. 25, 1955, Ser. No. 503,713, now Patent No. 2,962,803, dated Dec. 6, 1960. Divided and this application Dec. 12, 1957, Ser. No. 702,427
1 Claim. (Cl. 336—198)

This invention relates to magnetic cores and, more particularly, to protectingly sheathed and/or encapsulated magnetic cores. This application is a division of pending application for patent in the name of John Paul Jones, Serial Number 503,713, filed April 25, 1955, now Patent No. 2,962,803, entitled "Apparatus and Method for Encapsulation of Magnetic Cores," and assigned to the same assignee as the present application, now Patent No. 2,962,-803.

In certain electronic equipment such as calculating machines, computers and the like, it is often advantageous, in order to increase operating efficiency and to take advantage of the relatively limited available space in such devices, to employ small magnetic cores as the storage elements in the memory arrays utilized therein. Such cores can take a variety of individual shapes and forms depending upon the particular circuit requirements and the electrical environment in which the core is to be utilized.

A well-known core shape used for the purposes outlined above comprises a ceramic bobbin having a hollow axial bore and having an individual shoulder or rim at each opposite end thereof defining a recessed hub portion therebetween. Certain desired electromagnetic properties result from the addition to the ceramic bobbin of a predetermined number of turns or wraps of magnetizable strip material which is secured around the hub between the rims. During the wrapping process the layers of magnetizable material may be coated with a paste of magnesium oxide and oil to form an insulating layer therebetween.

The wrapped material is relatively fragile and is extremely thin, being on the order of one mil or less. Generally, the number of wraps per bobbin is usually insufficient to fill the recess between the hub and the edges of the bobbin rims. Any rough, careless or unusual handling of the core at this stage in its fabrication will tend to deform the wraps, or, if the handling pressures are too great the turns of the wrap could be easily shorted together. Furthermore, the electromagnetic characteristics of the core may be upset or destroyed entirely due to the deleterious effects of moisture, heat, corrosive gases and foreign particles.

It is, therefore, an important object of the invention to provide a magnetic core article which is relatively unaffected by rough or unusual handling.

It is another important object of the invention to provide a simple, inexpensive, sealed magnetic core article.

It is an additional object of the invention to provide a novel sheathed small toroid in a snug fitting plastic sleeve which is sealed from the atmosphere.

In accordance with one embodiment of the invention, there is provided an encapsulated article of manufacture comprising a non-magnetic bobbin having oppositely disposed rims and a slightly smaller dimensioned hub therebetween. A number of winding turns of magnetizable material having the desired square hysteresis loop and other magnetic characteristics, is wrapped around the hub of the bobbin. The bobbin is then axially introduced into an insulating sleeve or jacket whose inner diameter is slightly less than the outer diameter of the bobbin rims making a squeeze fit therein. The dimension of the sleeve material is chosen to accommodate the selected bobbin rim diameter and so varies with choice. Once the non-magnetic bobbin is tightly secured within the protecting sleeve the opposite ends of the sleeve may be trimmed off close to the bobbin rims after which the exposed rim surfaces may be sealed or covered by spraying, dipping or covering with an adhesive insulating material which is annealed or otherwise sealed to the freshly cut insulating sleeve ends. The resulting article is thus sealed from the atmosphere.

Other objects and advantages of the present invention will appear from a reading of the detailed description set forth hereinafter, the description being by way of illustration and explanation only, and not by way of limitation and wherein the accompanying drawings illustrate a preferred embodiment of the apparatus in which:

FIG. 1 is an isometric view of an encapsulating apparatus according to the invention;

FIGS. 2 through 5 inclusive are isometric views of the apparatus of FIG. 1 illustrating successive steps in encapsulation of magnetic core bobbin within a plastic tube or sleeve in accordance with the invention;

Figure 8:
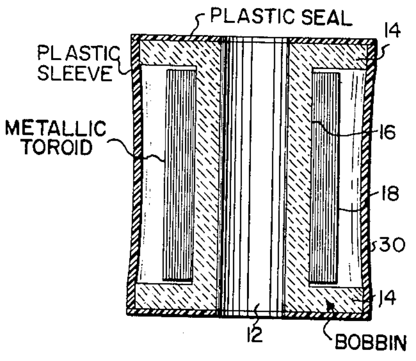
FIG. 8 is an enlarged sectional view diametrically through a magnetic core encapsulated in accordance with the teachings of this invention; and, FIG. 9 is an isometric view of a completed magnetic core assembly including electrical operating windings thereon.

An encapsulated magnetic core assembly according to the invention, without electrical windings thereon, is illustrated in the sectional side elevational view of FIG. 8. In the illustrated embodiment the complete magnetic core assembly comprises a non-magnetic supporting bobbin 10 of lightweight refractory material such for example as ceramic. The bobbin material is a matter of choice determined in part by the desired shape or configuration which the bobbin structure is to assume and in part by the space allotment available for the core assembly. The bobbin illustrated herein by way of example may be provided with a hollow axial bore 12 and lateral projecting shoulders or rims 14—14 at the opposite ends thereof defining a recessed area or hub 16 therebetween. The recessed area between the rims is adapted to receive a plurality of turns or wraps of any electrically conductive magnetizable strip material 18 forming a metallic toroid therearound. In the illustrated embodiment of the invention, as is evident in FIG. 8, the wraps of the metallic toroid do not completely fill up the recessed area 18 of the bobbin. A slight vacant area or clearance 19 remains from the periphery of the wrapped material 18 to the outer periphery of the two rims 14—14.

The magnetizable strip wrapping material, which is extremely thin, being on the order of one mil or less, is delicate and easily deformed or broken due to careless or rough handling. The individual turns of the wrapped material are insulatingly coated during manufacture with a mixture of magnesium oxide and oil after which the wrapped core is heat annealed. The applied heat, among other things, tends to draw off the solvents in the oil mixture and leaves a finely divided insulating coating which is separatingly disposed between each of the various layers of the metallic toroid. Once the wraps of magnetizable material have been applied to the bobbin and the protecting sheath, now to be described, has been applied, a plurality of electrical conductors 42 may be threaded through the bore of the core and around and about the sheathed core to form a complete magnetic core assembly or component 44 as shown clearly in FIG. 9. In this form the magnetic core is thereby adapted for utilization in electrical circuits of computers, business machines and the like.

Figure 1:
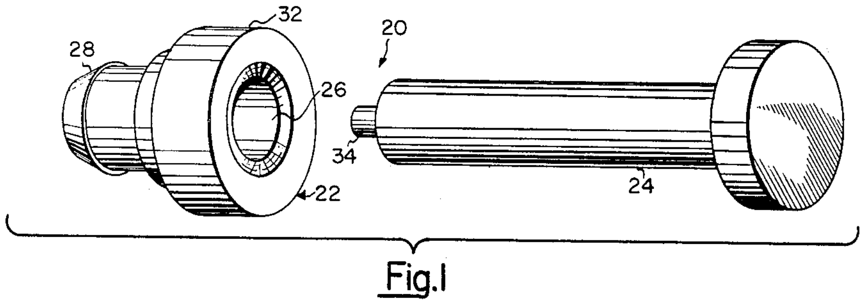
Figure 2:
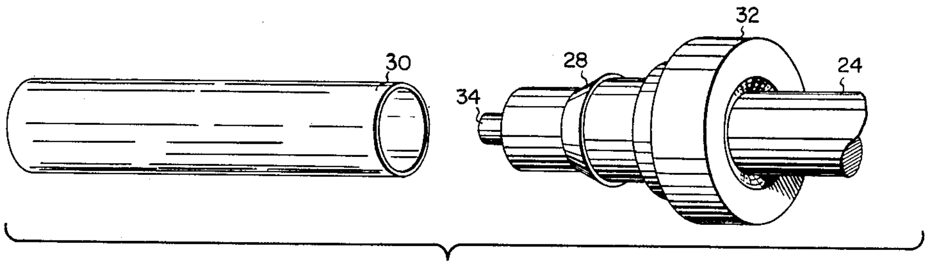

A novel means capable of protecting the wrapped core and of overcoming the disadvantages earlier described, and one which will provide a simple, inexpensive and readily fabricated assembly that is sturdy and moisture proof, is set forth in the earlier mentioned copending application and described herein as one method and apparatus for producing the article herein claimed. This apparatus is illustrated by way of example only in FIG. 1 of the drawings. The encapsulation apparatus is generally referred to by the reference character 20 and comprises two separate sub-assemblies, namely, a tube or sleeve spreader or dilator 22 and a ram rod 24 telescopically receivable therein. The dilator 22 comprises a slightly elongated body having an axial bore 26 of constant diameter extending centrally therethrough. One end portion of the dilator is reduced as indicated at 22 and is provided with a tapered rearwardly slanting dilating shoulder or lip 28 for expanding the internal diameter of an insulating tube 30, FIG. 2, as will be described later on. The opposite end portion of the dilator 22 is enlarged as at 32 to provide handling means therefor. The ram rod or plunger 24, having a radial dimension for a sliding fit with the inside dimension of the dilator 22, is slidably, telescopically receivable within the bore 26 thereof. The plunger is of sufficient length so that when it is received within the dilator it can extend completely through the bore of the dilator and project outwardly beyond both end portions thereof as is evident in FIG. 3. This feature provides for ease of insertion and removal of the ram rod. One end portion of the ram rod 24 is also reduced as indicated by the reference character 34 and as clearly shown in FIGS. 1 through 4 inclusive. The reduced end portion 34 is of a diameter relative to the axial bore of the bobbin to fit loosely through the bore and to thereby support the bobbin during the encapsulation procedure.

Conventional, well-known spaghetti tubing, usually made of plastic material and ordinarily used as wire insulating material in radio and electronic equipment, is employed in the present invention to provide a relatively inexpensive and readily obtainable dielectric protecting sheath or sleeve for the bobbin. The spaghetti tubing 30, of proper internal radial dimensions to tightly or snugly fit a bobbin of selected size, is conveniently adapted for use with the present apparatus by virtue of its semi-rigid yet yielding pliability. The use of tubing as an insulating sleeve for the core bobbin offers simple yet efficient protection for the bobbin body and thus for the metallic toroid which is disposed around the hub thereof. Whereas an insulating coating, applied by spraying or dipping techniques, would tend to hug the wrapped material quite closely and thus tend to transmit external forces and handling pressures thereto which would be generally quite harmful, the tubing or sleeve is spaced away from the wrapped material a slight distance due to the rims of the bobbin and the fact that the metallic toroid does not extend outwardly from the bobbin hub to the periphery of the bobbin rims. The tubing although resilient and therefore pliable has an inherent rigidity or resistivity to lateral or radial deformation or compression and thus while the tube section on the bobbin may be compressed or dented slightly as the result of external forces, it still offers sufficient resistance to such forces as to prevent any penetration thereof to the metallic wrap.

The step-by-step operational views of FIGS. 1 through 5 inclusive illustrate an encapsulation method and one form of apparatus for its accomplishment according to the aforementioned application. The various views will be described simultaneously. A magnetic core bobbin 10 as earlier described with reference to FIG. 8, of suitable dielectric material such as ceramic, having flanges or rims disposed at opposite ends thereof and a hollow axial bore therethrough is provided with a plurality of wraps 18 of magnetizable material which are wound around the hub. The last two turns of the wrapped material may be fastened together as by welding to prevent the accidental dislodgement or unwinding of the strip therefrom.

Figure 3:
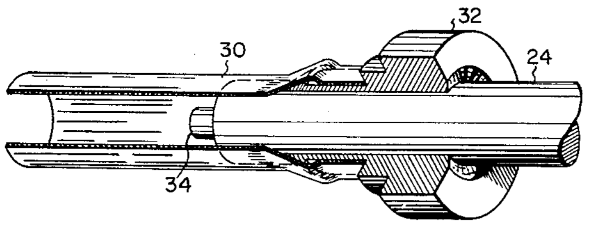

The ram rod 24 has its reduced end portion 34 inserted within the open end of a length of readily available spaghetti tubing 30. The tubing may be vinyl acetate or other similar dielectric plastic material. The dilator 22 is then received over the ram rod and pushed forward against the leading edge of the insulating tubing. The reduced end portion of the ram rod is then advanced well into the tubing, supporting the tubing radially so that the frusto-conical lip 28 of the dilator may be pushed against the edge of the tubing to permit the lip to lift the edge of the tubing and force the tubing to ride up on the rearwardly slanting shoulder of the dilator. The resulting position of the parts at this step is shown in FIG. 3. In this manner the dilator is received well within the end of the tubing. The ram rod 24 is then withdrawn from the tubing and the dilator.

Figure 4:
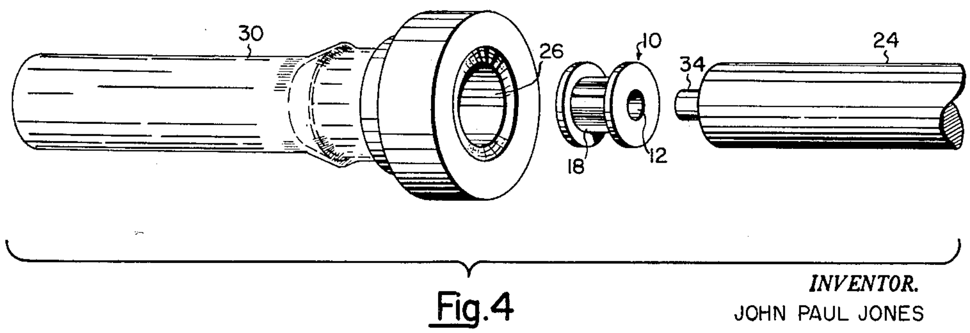
Figure 5:
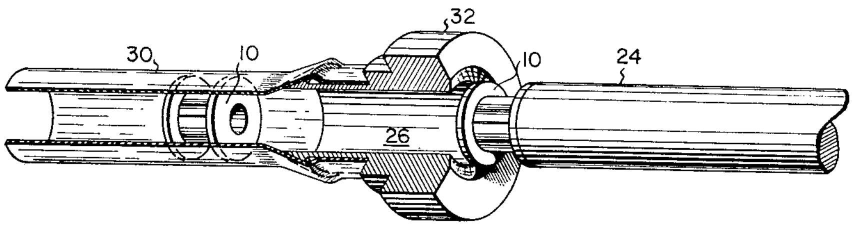
Figure 6:
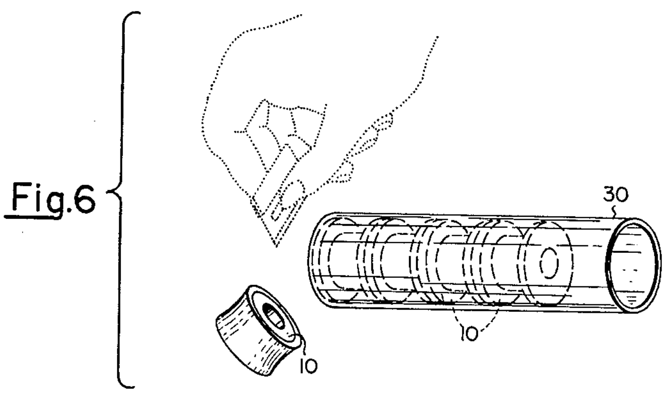
FIG. 6 is a diagrammatic representation illustrating one manner of separating the individual core bodies from one another.

A magnetic core bobbin 10 such as the one shown in FIG. 4 is slipped onto the reduced end portion 34 of the ram rod. The ram rod with the bobbin thereon is once more inserted into the dilator, and is then advanced well into the tubing so that the tubing contractually snugly surrounds the bobbin. The rod is then withdrawn from the tubing and dilator leaving the bobbin in the tubing as shown in FIG. 5. Another bobbin is placed on the reduced end portion of the ram rod and the operation repeated until the desired number of bobbins has been inserted within the insulating tube or sleeve 30. The cores may be pushed into the tubing 30 in batches of three or four or more. The tubing is then slipped back off the spreader or conversely the spreader is withdrawn from the tubing. The tubing is then sliced into sections each of which contains a core. The slicing action may be manually performed with a razor blade in the manner illustrated in FIG. 6.

Figure 7:
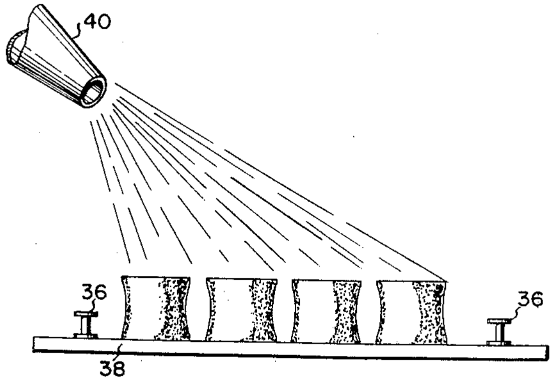
FIG. 7 is an isometric view illustrating the manner of sealing the exposed ends of the core as taught by the invention.

In order to protect the ends of the cores exposed by the slicing operation, a covering may be applied thereto in any suitable fashion such as by means of coating, dipping or by the spraying technique shown in FIG. 7. For this latter operation, a number of cores are disposed in rows on a series of vertically projecting terminals 36 which are mounted on a base 38 and act as supporting pedestals for the core bobbins. Insulating material in the form of a spray may then be applied to the core bodies in mass formation by a sweeping motion of a spray gun 40 which is repeatedly passed back and forth over the cores coating the upper exposed ends of the cores. The sprayed material is permitted to dry after which the individual core bodies are inverted and repositioned on the pedestals 36 and the spraying operation is repeated to coat the opposite ends of the cores.

Figure 9:
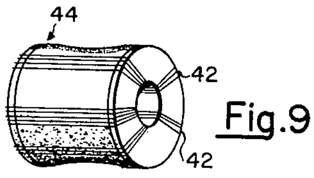

A core bobbin which has been encapsulated by means of the foregoing method and apparatus is shown in FIG. 8. The sides and opposite end portions of the core are thus completely sealed in a plastic envelope. The ends of the bore 12 of the core are left open and through the bore the turns of one or more electrical windings 42 may be extended as shown in FIG. 9. Cores prepared in the manner above described have been tested both before and after immersion in water from periods ranging from an hour to twenty-four hours in length and show no deleterious effects. The encapsulated core bodies have also been heat cycled at a temperature of 125° C. with little or no harm to the core bobbin.

There has thus been described a novel article of manufacture having high mechanical resistance to external forces as well as ease of handling; and which incorporates the advantages of moisture resistance, corrosive gas resistance, as well as resistance to the ingress of foreign particles such as dirt, etc.

What is claimed is:

A magnetic core component comprising, in combination, a bobbin of non-magnetic material having a central open-ended axial bore extending therethrough and including a pair of exterior laterally projecting shoulders or rims forming therebetween a peripheral recess, magnetizable material disposed in said peripheral recess and having a radial dimension less than the outer radius of the shoulders so as to lie fully within said recess, means immobilizing said magnetizable material on said bobbin, a flexible sleeve of insulating dielectric plastic material normally of less diameter than said shoulders and positioned thereover in a manner overlying the bobbin tightly contractually engaging the shoulders of the bobbin so as to extend between the shoulders in spaced relation to the magnetizable material such that the shoulders make continuous radial contact with the sleeve thereby forming a protective sheet over the magnetizable material within the recess, dielectric material bonded to the sleeve ends and covering the opposite end surfaces of the bobbin whereby the sleeve and the bobbin are tightly joined together to form a hermetically sealed unitary assembly, and one or more electrical windings distributively disposed on the bobbin inductively coupled to the magnetizable material within the recess, each of said windings extending through the bore of the bobbin and around the outside thereof and closely over the exterior surfaces of the plastic envelope surrounding the bobbin, the envelope in addition to its protective function serving as an electrical insulating medium between the one or more windings of the magnetizable material.

References Cited in the file of this patent

UNITED STATES PATENTS

| | | |
|---|---|---|
| 2,823,372 | Jones | Feb. 11, 1958 |

FOREIGN PATENTS

| | | |
|---|---|---|
| 439,081 | Great Britain | Nov. 28, 1935 |
| 584,549 | Great Britain | Jan. 17, 1947 |